United States Patent [19]

Masuishi et al.

[11] Patent Number: 5,065,400
[45] Date of Patent: Nov. 12, 1991

[54] METHOD FOR EDITING AND EXECUTING COMPUTER PROGRAMS

[75] Inventors: Tetsuya Masuishi, Machida; Hiroshi Tsuji, Kawasaki; Takahashi Matsui; Akihiko Koga, both of Yokohama, all of Japan

[73] Assignee: Hitachi, Ltd., Tokyo, Japan

[21] Appl. No.: 245,530

[22] Filed: Sep. 16, 1988

[30] Foreign Application Priority Data

Sep. 18, 1987 [JP] Japan ................ 62-232114

[51] Int. Cl.$^5$ ................ G06F 9/40
[52] U.S. Cl. ................ 371/19; 364/280.7; 364/281.3; 364/DIG. 1; 395/700
[58] Field of Search ................ 364/300, 280.7, 281.3; 371/19

[56] References Cited

U.S. PATENT DOCUMENTS 4,558,413 12/1985 Schmidt et al. ................ 364/300
4,809,170 2/1989 Leblang et al. ................ 364/200

OTHER PUBLICATIONS

Information Processing (Japan), "Yale Tools", vol. 25, No. 8, 1984, pp. 790–799.
Schmidt, E., "Controlling Large Software Development in a Distributed Environment", Xerox Palo Alto Research Centers Publication, CSL-82-7, Dec. 1982, pp. 75–102.

Primary Examiner—Stephen M. Baker
Attorney, Agent, or Firm—Antonelli, Terry Stout & Kraus

[57] ABSTRACT

In a method for editing and executing a program in a processing apparatus, the program is subdivided into modules which are units for validating correction thereof. A control table is provided having a flag for each module to indicate whether or not an edited program associated therewith has been corrected. Each time a program is corrected, the correction thereof is registered to the table, thereby only permitting the execution of a program module for which the pertinent flag of the table indicates the program correction.

4 Claims, 13 Drawing Sheets

FIG.2

| MODULE NAME | ONT | ERR | NEX | EDT |
|---|---|---|---|---|
|  |  |  |  |  |
|  |  |  |  |  |
| ⋮ | ⋮ | ⋮ | ⋮ | ⋮ |
|  |  |  |  |  |

| MODULE NAME | MESSAGE QUEUE id |
|---|---|
|  |  |
|  |  |
| ⋮ | ⋮ |
|  |  |

```
translate(){
    struct module_table *p;          701
    int lockid=1;    702
    init_semaphore();           704
    for(p=mtbl_head;p<mtbl_tail;p++){
703     if((p->state&NEX)&&(p->state&ERR==0)){
          if(p->state&EDT){                              706
705         send_editor("save_to_pipe",lockid++,p->modulename);
            send_executer("translate_from_pipe",p->modulename);
          }else{
            send_executer("translate_from_file",p->modulename);
          }
          p->state1 = ONT;
        }
    }
    send_executer("execute");
}
```

FIG. 9

```
#include <sys/types.h>
#include <sys/ipc.h>
#include <sys/sem.h>
```

```
              save_to_pipe(lockid) int lockid;
              {
801 ─────────── lock_pipe(lockid);                    } 901
802 ─────────── save_buffer_to_pipe();
803 ─────────── unlock_pipe(lockid);
              } lock_pipe(lockid) int lockid;
              {
                  struct sembuf semop;

semop.sem_num = 1;                  } 902
                  semop.sem_op = -lockid;
904 ─────────── semop(semid,&semop,1);
              } unlock_pipe(lockid) int lockid;
              {
                  struct sembuf semop;

semop.sem_num = 1;                  } 903
                  semop.sem_op = lockid+1;
905 ─────────── semop(semid,&semop,1);
              }
```

METHOD FOR EDITING AND EXECUTING COMPUTER PROGRAMS

BACKGROUND OF THE INVENTION

The present invention relates to a method for editing and executing computer programs, and in particular, to a method for editing and executing computer programs suitable for repeatedly correcting and executing computer programs.

Conventionally, for an operation in which an editing operation and an executing operation of a program are effected in an associated fashion, there has been known a method, for example, written in pages 790 to 799 of the Information Processing, Vol. 25, No. 8 (1984) in which a text inputted by use of an editor is supplied as an input to an execution system or the like.

In such a prior art technology, a correction of a program to be executed can be effected by use of a redefinition command of the execution system; however, the correction of the program to be executed cannot be achieved by use of an editing function of the editor such as insertion of some characters.

SUMMARY OF THE INVENTION

It is therefore an object of the present invention to provide a method for editing and executing a program in which a program to be executed is corrected by use of an editing function of an editor so as to automatically reflect the result of the correction to the execution of the program.

In order to achieve the object above, there is provided a method according to the present invention in which a program to be executed is subdivided into units each for validating a correction of the program such as file units or function units (each referred to as a module hereinbelow) and there are disposed a module control table and a flag located in said table for each module indicating whether or not a correction has been achieved such that the table is accessed from an editor and an execution system.

In this situation, in a case where a module under an editing operation has been corrected, the editor sets the corresponding flag in the table to an ON state, so that the execution system before the actual execution replaces the modules for which the flag is ON in the table. As a result, the execution system replaces only the modules that have undergone some corrections in any case and hence the result of the correction is automatically reflected on the execution.

BRIEF DESCRIPTION OF THE DRAWINGS

The present invention will become more apparent from the following detailed description taken in conjunction with the accompanying drawings in which:

FIG. 2 is a schematic diagram showing a data structure in a manager process;

FIG. 9 is a source program listing associated with the processing flow of FIG. 8 described in the programming language C on the Unix System V;

DESCRIPTION OF THE PREFERRED EMBODIMENTS

Figure 1:
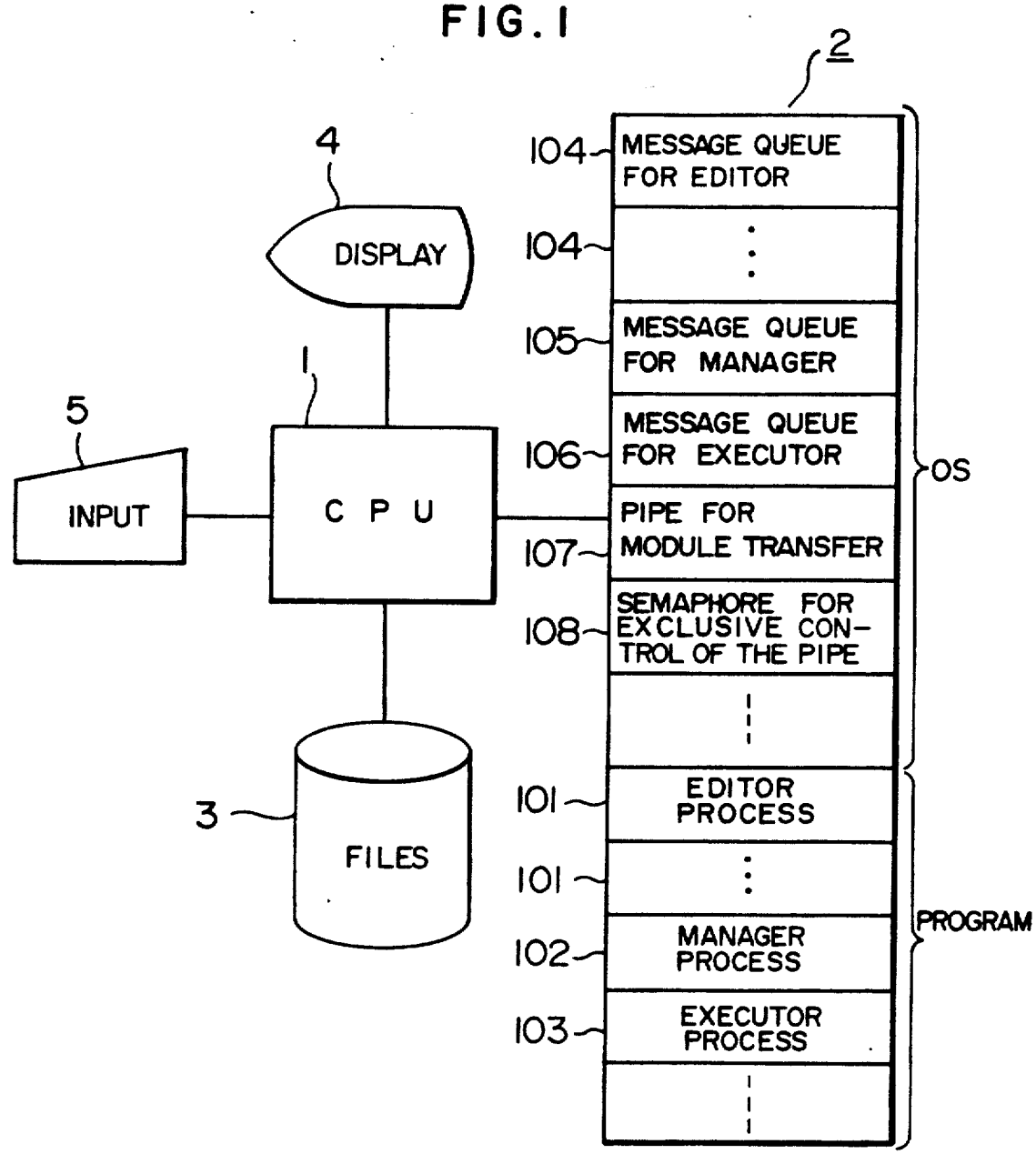
FIG. 1 is a configuration diagram of an embodiment of a system implementing a method for editing and executing programs according to the present invention.

Referring now to the drawings, description will be given of embodiments according to the present invention.

FIG. 1 shows the configuration of an embodiment of a system in which a method for editing and executing a program is implemented according to the present invention. The configuration includes a computer system comprising a central processing unit (CPU) 1, a string of memory units 2, files 3, a display 4, and an input device 5.

Of these components, the memory units 2 include areas in which an operating system (OS) and various programs are stored for processing in the CPU 1.

The program area is used to store processes such as editor processes 101, a manager process 102, and executor processes 103. An arbitrary number of editor processes 101 can be generated within the capacity of the memory units 2. These processes 101 to 103 are executed in the CPU 1.

The OS area is employed to store message queues 104 for the editor processes 101, a message queue 105 for the manager process 102, a message queue 106 for the executor process 103, a pipe 107 for module transfer, a semaphore 108 for exclusive control of the pipe 107, and the like. An arbitrary number of message queues for editor 104 can be generated according to the number of the editor process 101.

The message queues for editors 104 are used to transmit an instruction from the manager process 102 to the editor processes 101 and there is disposed one message queue for editor 104 for each editor process 101. The message queue for manager 105 is adopted to transmit an instruction from the editor process 101 or the executor process 103 to the manager process 102. The message queue for executor 106 is employed to transmit an instruction from the manager process 102 to the executor process 103. The pipe for module transfer 107 is disposed to transfer a program from the editor process 101 to the executor process 103. The semaphore for exclusive control 108 is used to effect an exclusive control between more than one write operation of the editor process 101 on the pipe for module transfer 107.

The memory 2 is used to store, in addition to those items described above, various tables which will be described later.

Figure 2:
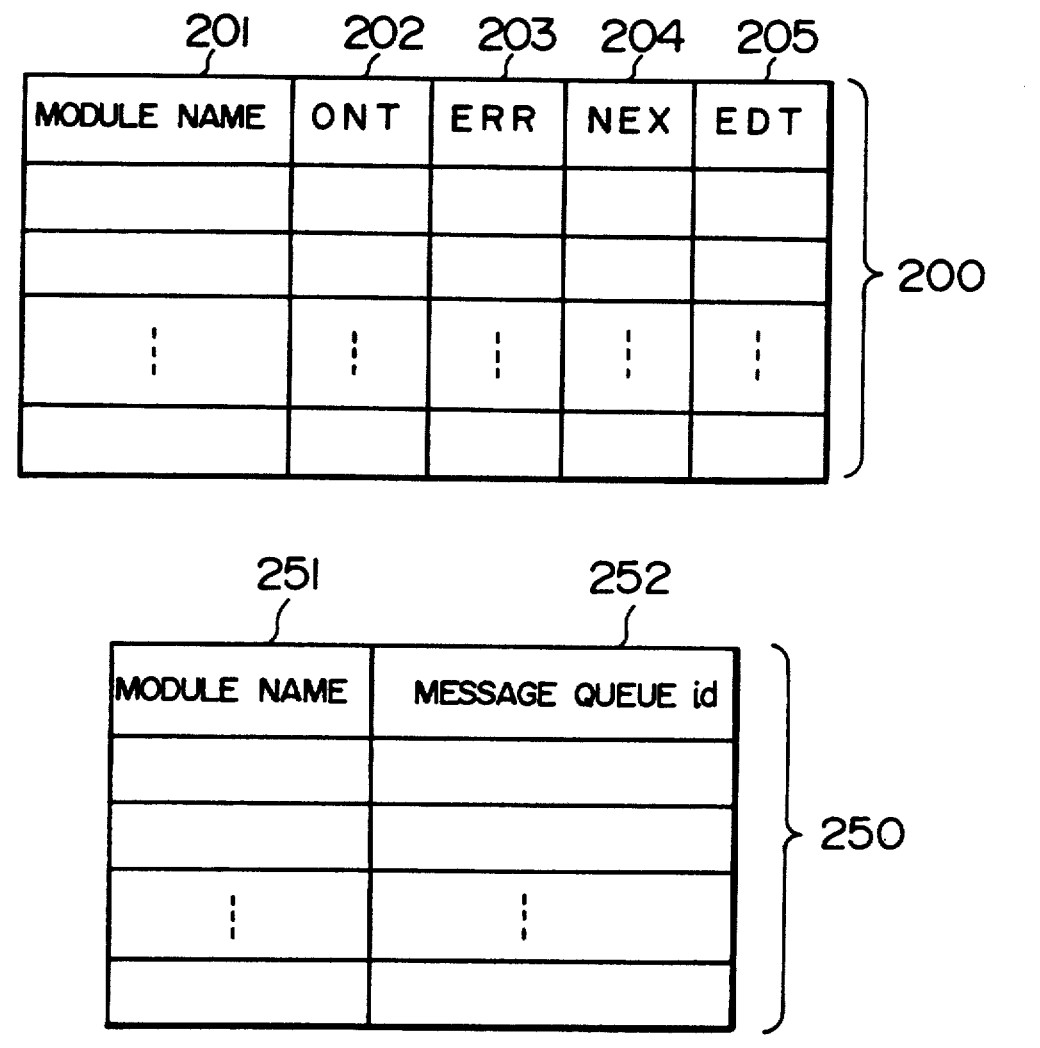

FIG. 2 shows a data structure of data in the manager process 102. Reference numeral 200 denotes a module control table for controlling modules as objects for the editing and execution in which 201 is a field for storing a module name, 202 indicates an ONT flag which is set to an ON state during an operation for fetching or calling a module into the executor process 103, 203 is an ERR flag which is set to an ON state when the module includes an error, 204 denotes an NEX flag which is set to an ON state when the module is not loaded into the executor process 103 or the module loaded into the executor process 103 has been corrected by the editor, and 205 is an EDT flag which is set to an ON state when the module is fetched into the editor process 101. Reference numeral 250 designates an editor control table for controlling editors set to an active state in which 251 indicates a field for storing a module name of a module loaded into the editor and 252 stands for a field for storing a message queue identifier (id) of a message queue for editor 104.

Figure 3:
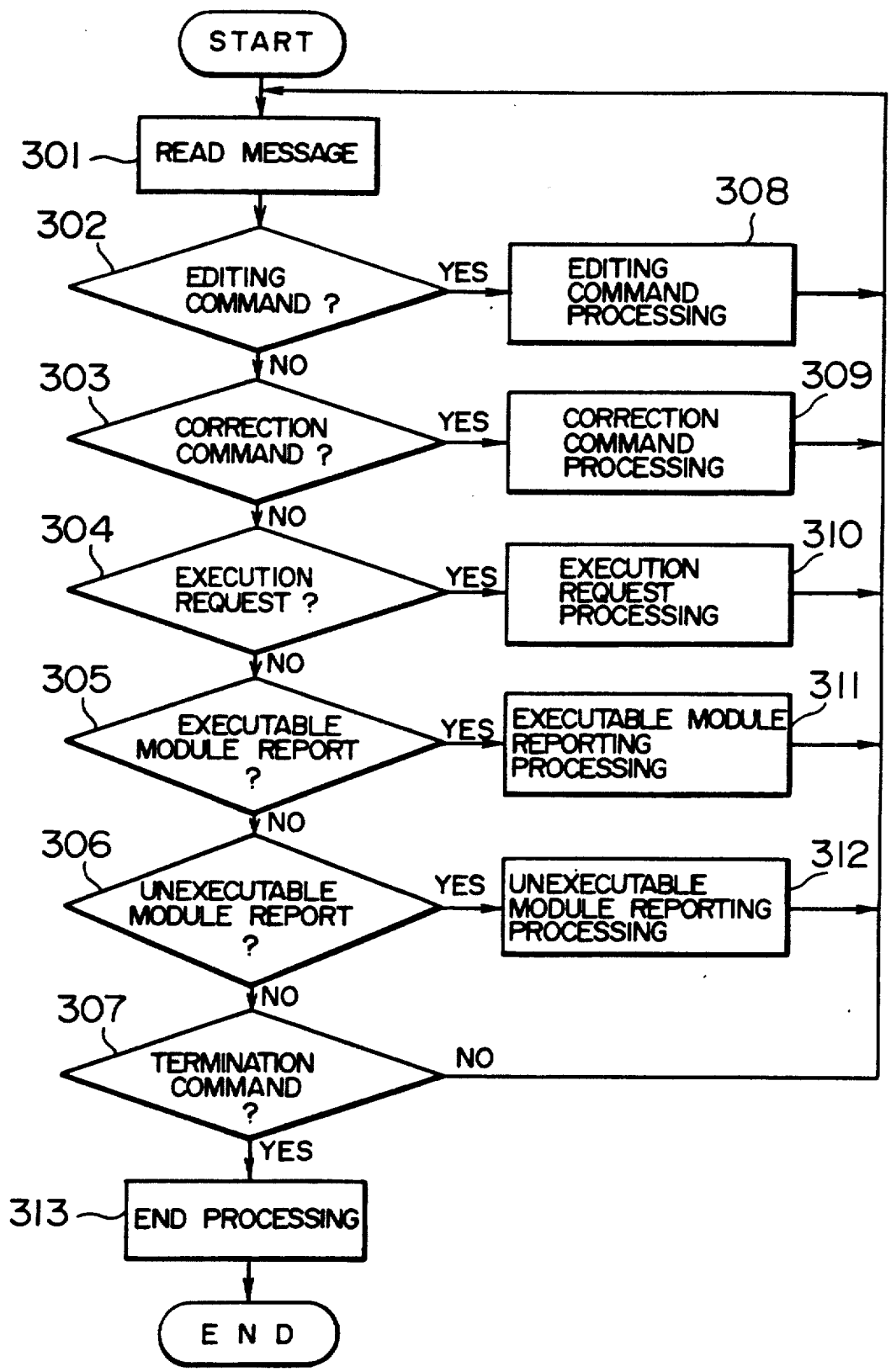
FIG. 3 is a flowchart showing the processing of the manager process.

FIG. 3 is a flowchart of the processing in the manager process 102. In step 301, a message is read from the message queue for manager 105, and then step 302 checks to determine whether or not the message read in the step 301 is an editing command. If this is the case, control is passed to step 308; otherwise, the processing proceeds to step 303, which checks to determine whether or not the message read in the step 301 is a correction report. If the message is a correction report, control is passed to step 309; otherwise the processing proceeds to step 304, which checks to determine whether or not the message read in the step 301 is an execution request. If this is the case, control is transferred to step 310; otherwise, the processing proceeds to step 305, which checks to determine whether or not the message read in the step 301 is an executable module report. If the message is an executable module report, control is passed to step 311; otherwise, the processing proceeds to step 306, which checks to determine whether the message read in the step 301 is an unexecutable module report. If this is the case, control is passed to step 312; otherwise, the processing proceeds to step 307, which judges to determine whether the message read in the step 301 is a termination command. If the message is a termination command, control is transferred to step 313; otherwise, the processing returns to the step 301. Step 308 executes processing associated with the editing command, step 309 executes processing related to the correction report, step 310 executes processing for the execution request, step 311 executes processing associated with the executable module report, step 312 executes processing for the unexecutable module report, and step 313 executes the termination processing.

Figure 4:
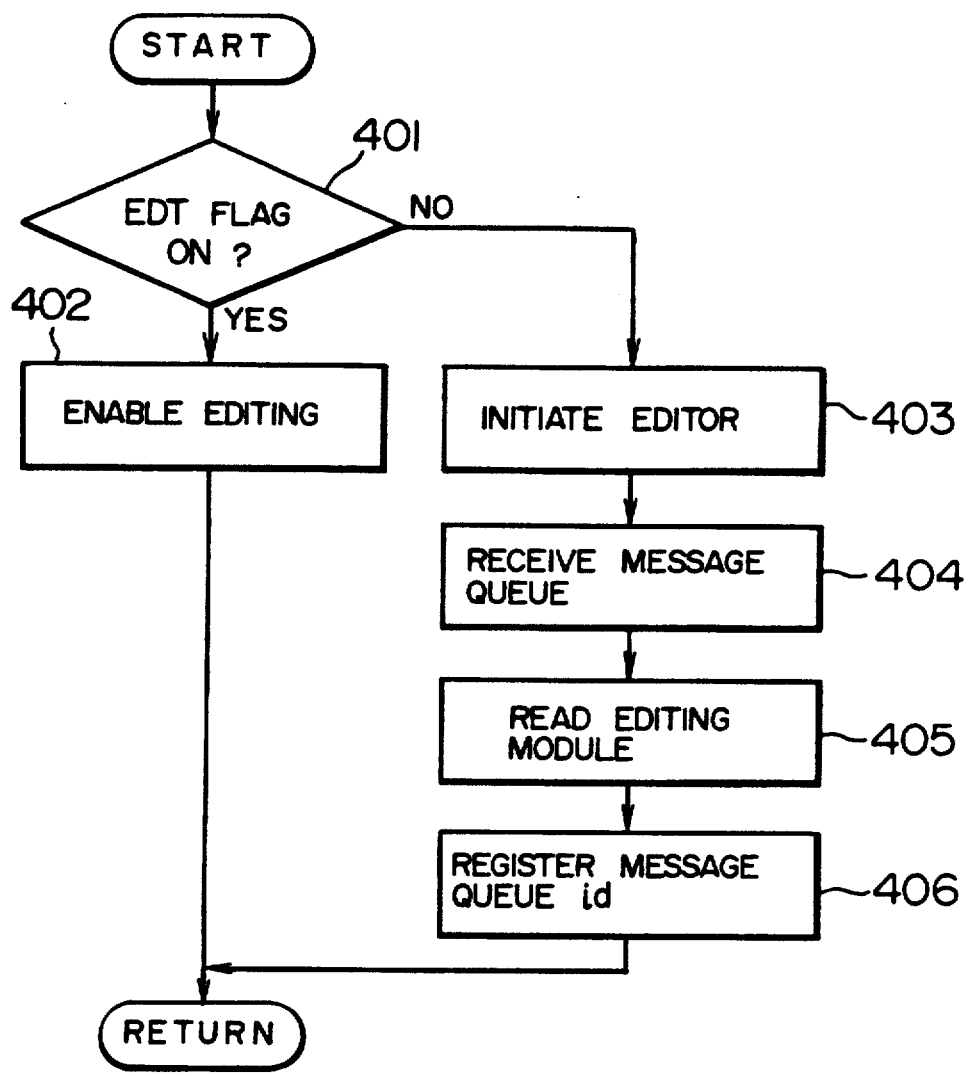
FIG. 4 is a processing flowchart showing details of an editing command processing step.

FIG. 4 is a flowchart showing in detail the processing step 308 associated with the editing command. In step 401, the module control table 200 is searched for a module as an object of the editing command for checking to determine whether the EDT flag 205 is ON or OFF. If the EDT flag 205 is ON, control is passed to step 402; otherwise or if the flag 205 is OFF, the processing proceeds to step 403. In the step 402, an editor process in which a module associated with the editing is enabled to receive an editing command. The step 403 initiates a new editor process, step 404 reserves a message queue for editor 104 and sends a command to obtain a module for the editing operation to the message queue 104, step 405 sets an EDT flag 205 corresponding to the editing module in the module control table 200 to an ON state, and step 406 registers a module name and a message queue identifier (id) to the editor control table 205.

Figure 5:
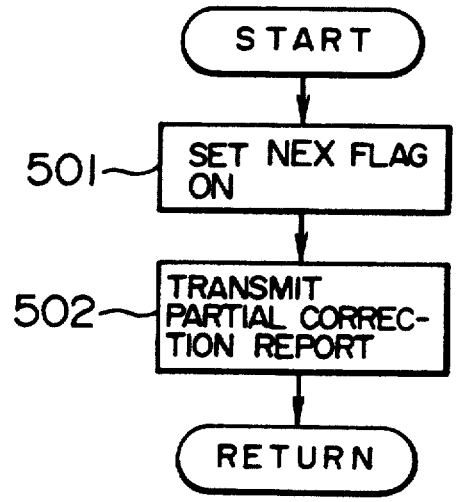
FIG. 5 is a processing flowchart showing details of a correction reporting processing step.

FIG. 5 shows a detailed flowchart of the step 309 executing the processing associated with the correction report. In step 501, the module control table 200 is searched for a module for which the correction report indicates that a correction has been effected so as to set an NEX flag associated therewith to an ON state. In step 502, a partial correction report is sent to the message queue for executor 106.

Figure 6:
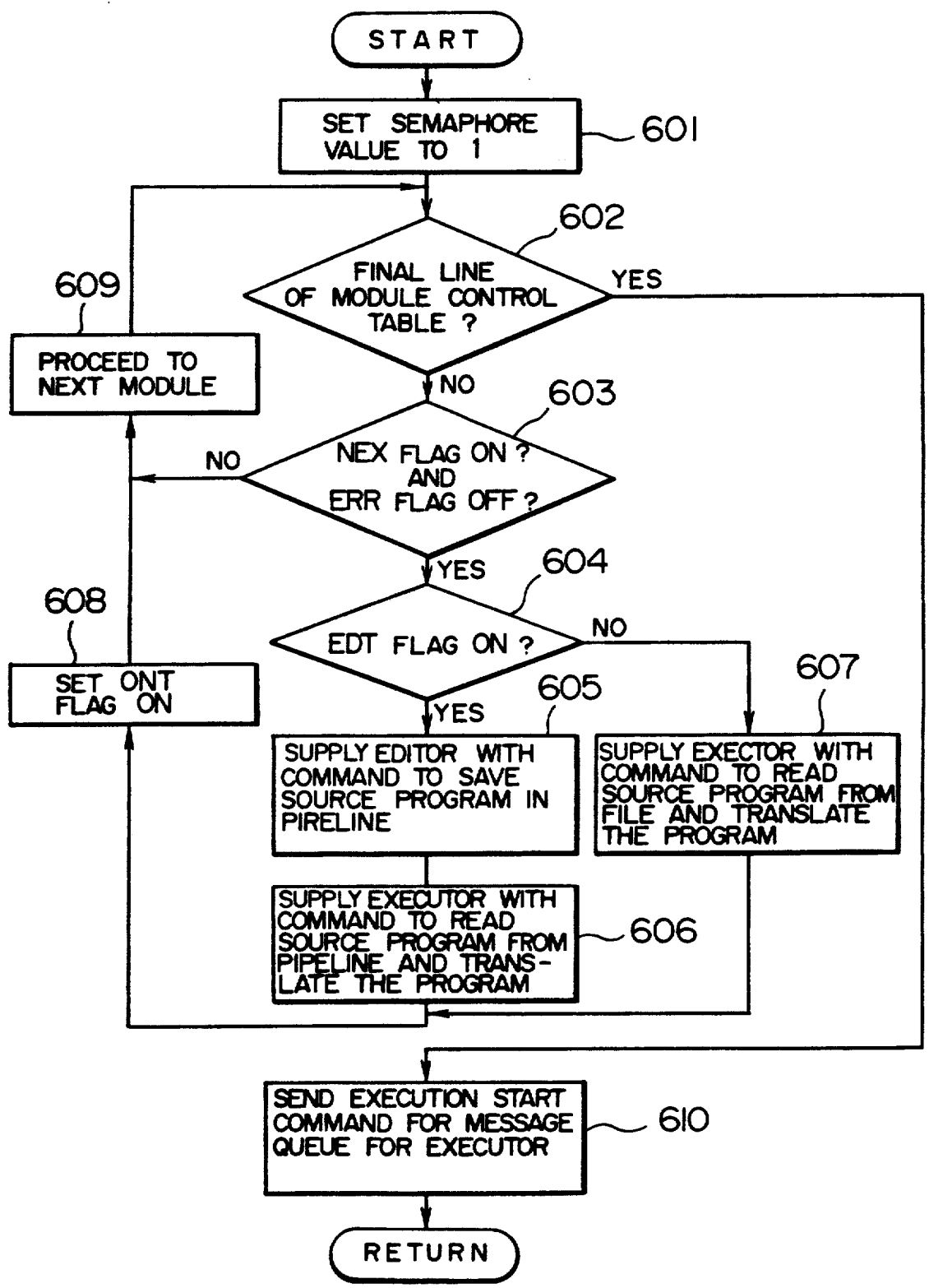
FIG. 6 is a processing flowchart showing details of an execution request processing step.

FIG. 6 shows details of the step 310 executing the processing for the execution request. In step 601, the first line of the module control table 200 is pointed so as to set the value of the semaphore for exclusive control 108 to 1 and to initialize an identifier (id as a local variable) of a lock (a kind of a counter) to 1 for the subsequent processing. Step 602 checks to determine whether or not the line of interest exceeds the last or final line of the module control table 200. If this is the case, control is transferred to step 610; otherwise, the processing proceeds to step 603, which checks for a condition that the NEXT and ERR flags of the object line are ON and OFF, respectively. If the condition is satisfied, control is passed to step 604; otherwise, the processing proceeds to step 609. The step 604 checks to determine whether or not the EDT flag of the object line is ON. If the EDT flag is ON, control is transferred to step 605; whereas, if the flag is OFF, the processing proceeds to step 607. In the step 605, the editor control table 250 is searched for an editor which edits the object module such that a command to save a source program loaded in the editor buffer in the pipe for module transfer 107 is supplied to a message queue for editor 104. In this operation, the lock id is transferred as an argument of the message. After the message is transmitted, the lock id is incremented. In step 606, a command to read a source program from the pipe for module transfer 107 so as to transform the program into an executable form is sent to the message queue for executor 106. The step 607 sends a command to read the object module from the file 109 so as to transform the module into an executable form is sent to the message queue for executor 106, step 608 sets the ONT flag 202 of the object module to an ON state in the module control table 200, the step 609 obtains a module subsequent to the object module in the module control table 200, and step 610 sends an execution initiate command to the message queue for executor 106.

Figures 7, 8:
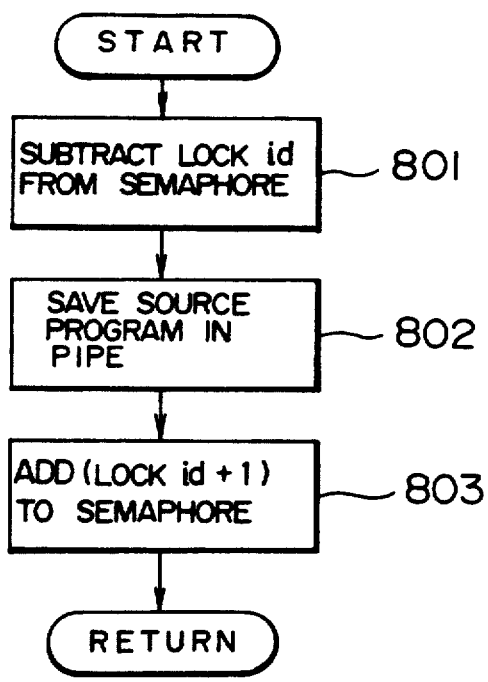
FIG. 7 is a source program listing associated with the processing flow of FIG. 6 described in the programming language C.
FIG. 8 is a flowchart of processing to be effected when the editor process receives an instruction to save data in a pipe for module transfer.

FIG. 7 shows a source program listing of the processing flow of FIG. 6 described in the programming language C. (For details, refer to the Programming Language C published by the Kyoritsu Shuppan (1981).) Reference numeral 701 indicates a pointer variable designating an object module in the module control table 200, 702 is a variable storing a lock id, which is beforehand initialized to 1, 703 designates a pointer indicating the first position of the module control table 200, 704 denotes a pointer of an external variable indicating a field subsequent to the field associated with the last module in the module control table 200, 705 indicates a field to store the ONT flag 202, the ERR flag 203, the NEX flag 204, and the EDT flag 205 in the module control table 200; and 706 is a field to store the module name 202 in the module control table 200.

FIG. 8 is a flowchart of the processing to be executed by the editor process 101 on receiving an instruction to save a program in the pipe for module transfer 107. In step 801, the lock id supplied as an argument of the received command from the semaphore for exclusive control 108. Step 802 saves the source program contained in the editor buffer in the pipe for module transfer 107 and step 803 adds a number attained by incrementing the lock id supplied as an argument of the received command to the semaphore for exclusive control 108. (For details about the semaphore, refer to the Unix System V Programmer Reference Manual published by the Kyoritsu Shuppan.)

FIG. 9 is a program listing of the processing of FIG. 8 described in the programming language C in the Unix System V. (For details about the semaphore, refer to the Unix System V Programmer Reference Manual published by the Kyoritsu Shuppan.) Program portion 901 effects the overall processing of FIG. 8 and comprises steps 801 to 803. Program portion 902 constitutes a program called lock-pipe for the step 801. Step 904 is a system call of the Unix System V to execute a subtraction from the semaphore. Step 903 is a program called unlock-pipe corresponding to the step 803. Step 905 is a system call of the Unix System V to execute an addition to the semaphore.

Figure 10A:
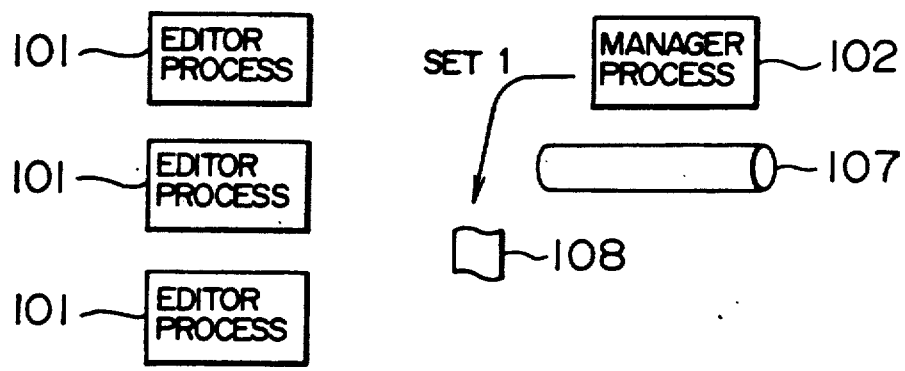
FIGS. 10A to 10I are schematic diagrams showing operations in a time series in which more than one editor process saves its editing module in a pipe for module transfer.
Figure 10B:
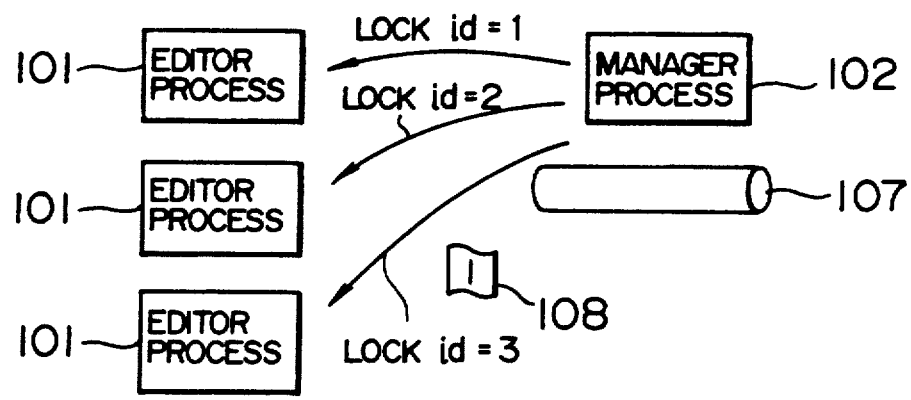
Figure 10C:
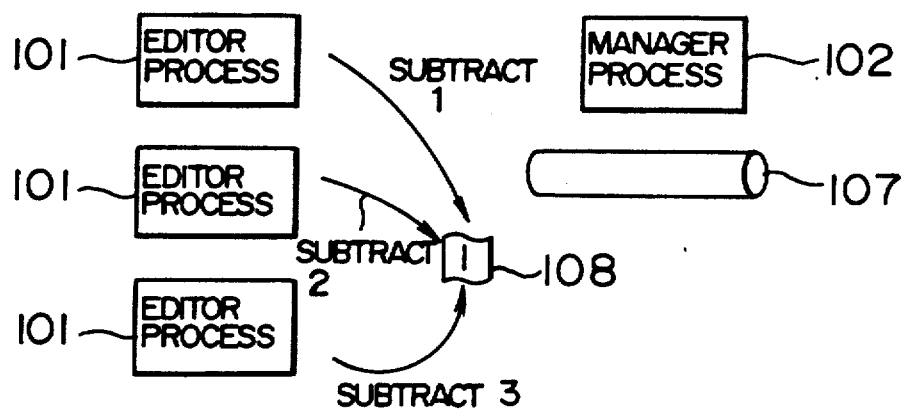
Figure 10D:
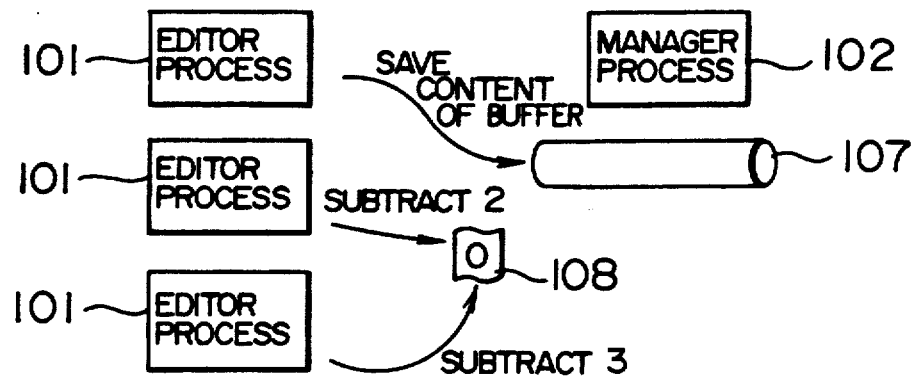
Figure 10E:
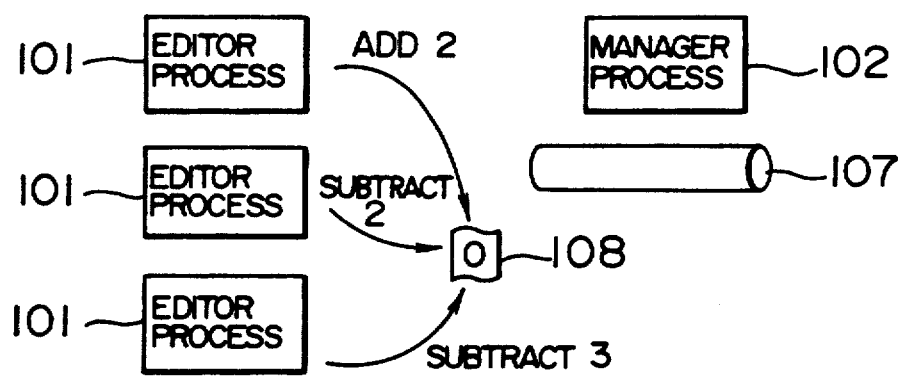
Figure 10F:
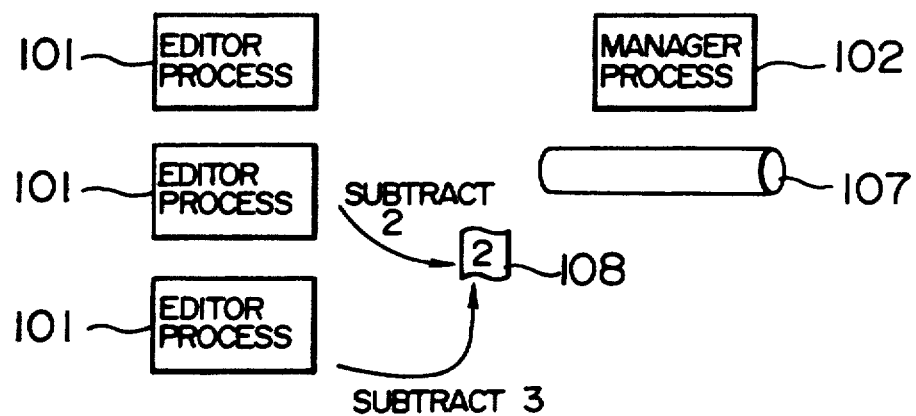
Figure 10G:
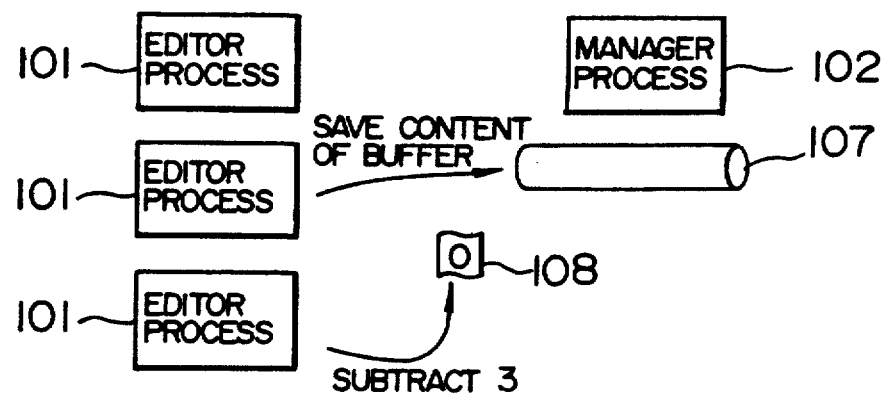
Figure 10H:
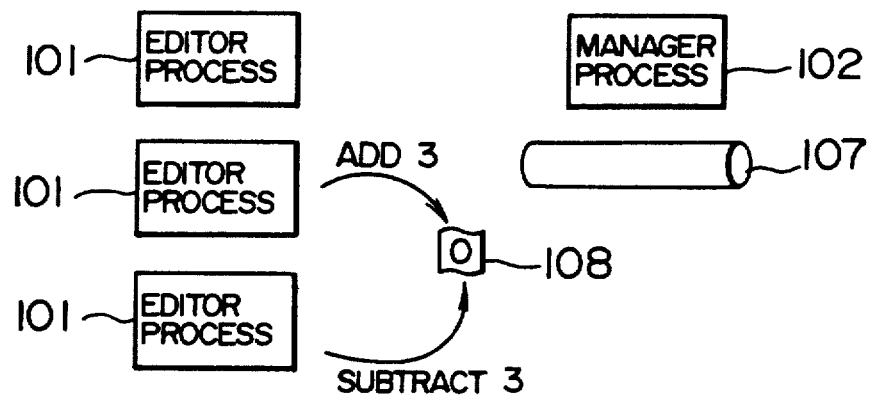
Figure 10I:
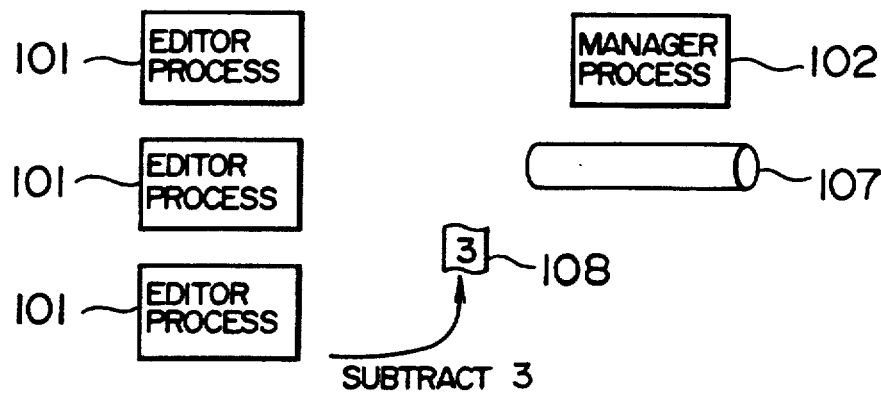

FIGS. 10A to 10I are schematic diagrams showing operations in time series in which a plurality of editor processes 101 save contents of buffers in the pipe for module transfer 107. FIG. 10A shows an operation in which the manager process 102 receives an execution request message and then executes the step 601, which sets 1 to the semaphore for exclusive control 108. In the operation diagram of FIG. 10B, the manager process 102 terminates the processing of FIG. 6 and thereafter a command to save a program in the pipe for module transfer 107 is sent to three editor processes 101 in the step 605; subsequently, lock id's 1 to 3 are assigned to the respective editor processes. In FIG. 10C, on receiving the command to save a program in the pipe for module transfer 107, the three editor processes 101 respectively execute the step 801, namely, each of three editor processes 101 subtracts the assigned lock id from the semaphore for exclusive control 108. The subtraction from the value of the semaphore is achieved as follows. 1: When the value of the semaphore is less than the subtrahend, the processing enters the wait state until the following condition 2 is satisfied. 2: When the value of the semaphore is at least equal to the subtrahend, the subtraction is effected in an unseparable fashion. (For details, refer to the Unix System V Programmer Reference Manual.) In the state of FIG. 10C, only the editor process for which the lock id is 1 effects the subtraction and the other two editor processes are in the wait state. In FIG. 10D, the editor process for which the lock id is 1 executes the step 802 and the other two editor processes are in the wait state for the execution of the step 801. In the operation diagram of FIG. 10E, the editor process for which the lock id is 1 completes the step 802 and executes the step 803. In the step 803, lock id + 1, namely, 2 is added to the semaphore for exclusive control 108. FIG. 10F shows a state in which the editor process with the lock id = 1 has completed the step 803. The value of the semaphore for exclusive control 108 is two in this state. In FIG. 10G, the editor process with the lock id = 2 leaves the wait state so as to complete the step 801 and then executes the step 802. The editor process for which the lock id is 3 is still in the wait state. In FIG. 10H, the editor process for which the lock id is 2 completes the step 802 and executes the step 803. In the operation diagram of FIG. 10I, the editor process for which the lock id is 3 executes the step 801 for the semaphore for exclusive control 108 having a value of 3 and enters the wait state. Since the value of the semaphore for exclusive control 108 is three, the step 801 is to be terminated. In this fashion, a plurality of editor processes do not simultaneously effect the write operations in the pipe for module transfer 107, namely, the write operations are achieved in a specified order.

Figure 11:
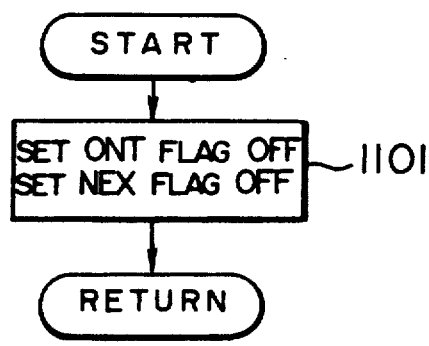
FIG. 11 is a flowchart showing details of an executable module reporting processing step.

FIG. 11 shows a detailed flowchart of the processing step 311 associated with the executable module report. In step 1101, the module control table 200 is searched for the module notified through the executable module report so as to set the ONT and NEX flags thereof to an OFF state.

Figure 12:
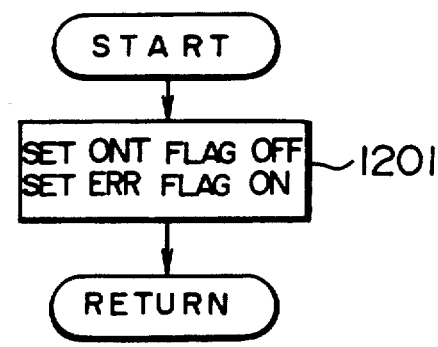
FIG. 12 is a flowchart showing details of an unexecutable module reporting processing step.

FIG. 12 shows a detailed flowchart of the processing step 312 associated with the unexecutable module report. In step 1201, the module control table 200 is searched for the module notified through the unexecutable module report so as to set the ONT and NEX flags thereof to an OFF state and an ON state, respectively.

Figure 13:
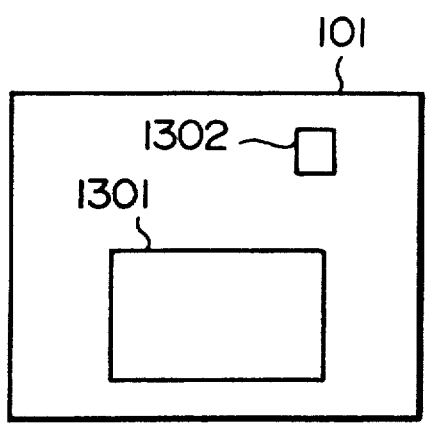
FIG. 13 is a diagram schematically showing an internal configuration of the editor process.

FIG. 13 is a schematic diagram showing the internal configuration of the editor process 101, which includes an editor buffer 1301 and a correction report flag 1302. The editor buffer 1301 is used to store therein a source program of a module to be edited, namely, data in the editor buffer is rewritten by use of an editing command.

Figure 14:
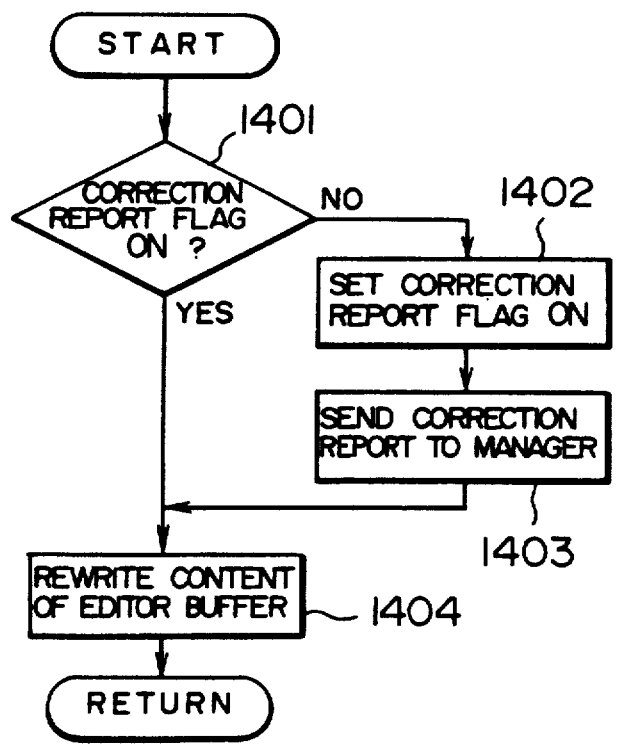
FIG. 14 is a flowchart of an editing processing in which the editor process rewrites data in the editor buffer.

FIG. 14 is a flowchart of an editing processing to rewrite data in the editor buffer 1301. In step 1401, a judge operation is achieved to determine whether or not the correction report flag 1302 is ON. If this is the case, control is passed to step 1404; otherwise, the processing proceeds to step 1402, which sets the correction report flag 1302 to an ON state. In the step 1403, a correction report message is sent to the message queue for manager 105. Step 1404 actually rewrites data in the editor buffer 1301.

Figure 15:
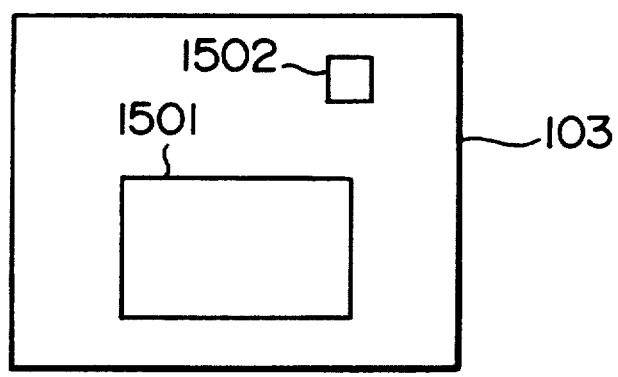
FIG. 15 is a diagram schematically showing an internal configuration of the executor process.

FIG. 15 is a schematic diagram showing the internal configuration of the executor process 103 in which reference numerals 1501 and 1502 indicate an executor buffer to store an executable program and a retranslation flag, respectively. The retranslation flag is set to an ON state when at least one module of the executable program in the executor buffer 1501 is corrected by the editor process 101.

Figure 16:
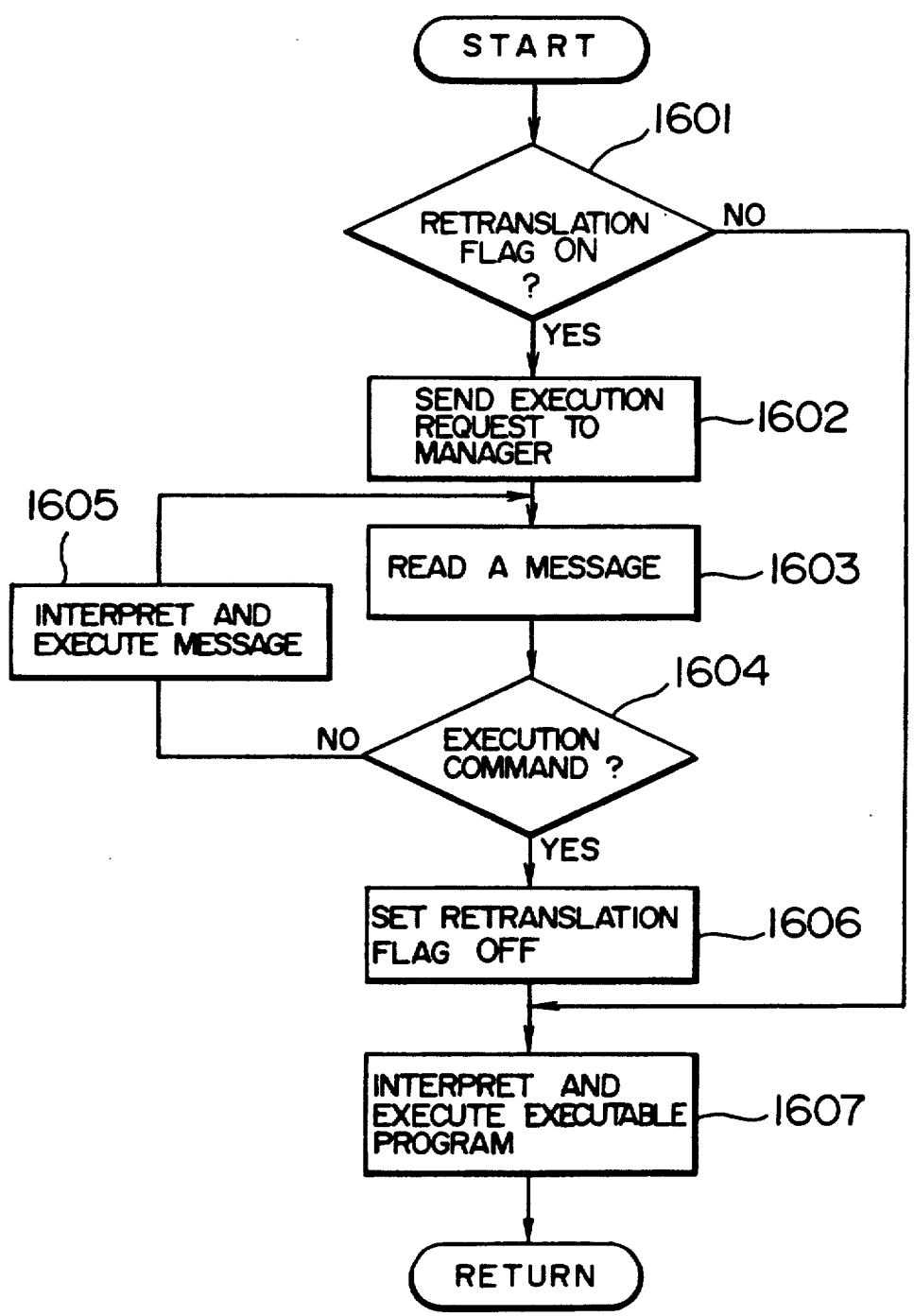
FIG. 16 is a flowchart of a processing in which the executor process executes an executable program in the editor buffer.

FIG. 16 is a flowchart of processing in which the executor process 103 executes an executable program in the executor buffer 1501. In step 1601, a judge operation is accomplished to determine whether or not the retranslation flag 1502 is ON. If this is the case, control is passed to step 1602; otherwise, the processing proceeds to step 1607. In the step 1602, an execution request message is sent to the message queue for manager 105. Step 1603 reads one message from the message queue for executor 105, step 1604 judges to determined whether or not the message read in the step 1603 is an execution command. If the message is an execution command, control is transferred to step 1606; otherwise, the processing proceeds to step 1605, which effects the interpretation and execution of the message read in the step 1603. If a translation command from the manager process 102 is received, the command is executed in the step 1605. In a case where the source program can be translated into an executable program as a result of the execution of the translation command, an executable module report is sent to the message queue for manager 105. If the source program includes an error and the translation thereof is hence impossible, an unexecutable module report is sent to the message queue for manager 105. Step 1606 sets the retranslation flag to an OFF state, step 1607 actually effects the interpretation and execution of the executable program in the executor buffer 1501.

Figure 17:
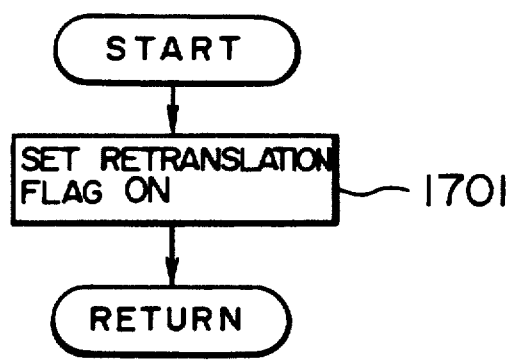
FIG. 17 is a flowchart of a processing to be achieved when the executor process receives a partial correction report.

FIG. 17 is a processing flowchart of processing in which the executor process 103 receives a partial correction report from the manager process 103 via the message queue for executor 106. Step 1701 sets the retranslation flag 1502 to ON.

According to the embodiment, even when a plurality of editors are initiated, only the corrected module can be retranslated into the executable state. Since the minimum number of necessary modules are retranslated, the processing performance is increased. In addition, when a source program is transferred from the editor process 101 to the executor process 103, the pipe is utilized, namely, the file is not employed, which as a result enables the transfer to be effected at a high speed.

According to the present invention, the result of the correction is automatically reflected on the execution, which leads to an effect that the operation is simplified in a debugging operation in which a program is repeatedly modified by an editor for the execution thereof. In addition, there is also obtained an effect that such an operation error can be avoided as that the debugging operation of the program is continued without translating the result of the correction into an executable program.

We claim:

1. A method of editing and executing a program including a plurality of modules comprising:

a first step for correcting, during an editing operation of a program, at least a portion of a module of the program;

a second step for effecting a registration to a control table including a first flag disposed for each module of the program to indicate whether the program has been corrected such that a program correction is registered to a first flag corresponding to the module corrected in said first step; and a third step for referencing the control table at an executing operation of a program so as to execute a program including a module corresponding to the first flag associated with the registration of the program correction;

wherein said control table includes, for each module, a second flag and a third flag which are respectively set to predetermined states when each module is loaded for the program editing and executing operations in said first and third steps respectively.

2. A method for editing and executing a program according to claim 1 further including a fourth step for referencing a second flag in the control table during the program editing operation so as to edit, when the second flag is in the predetermined state, a module corresponding thereto.

3. A method for editing and executing a program according to claim 1 further including:

a fourth step for referencing a second flag in the control table during the program editing operation so as to initiate an editor process when the second flag is in a state other than the predetermined state;

a fifth step for reserving a message queue for the editor; and to the predetermined state in the control table.

4. A method for editing and executing a program according to claim 1 further including:

a fourth step for referencing the control table such that when a first flag of the control table indicates a registration of a program correction therein and a second flag is in the predetermined state, a module associated therewith is loaded for an execution of the module; and a fifth step for setting a third flag in the control table to the predetermined state when the module is loaded.

* * * * *